Sept. 2, 1958 D. W. QUIRK 2,850,612
ELECTRIC BAKING AND BROILING OVENS
Filed Oct. 29, 1953 3 Sheets-Sheet 1

INVENTOR.
Douglas W. Quirk
BY
*Smith, Olsen, Baird & Gulbrandsen*
Attys.

Sept. 2, 1958      D. W. QUIRK      2,850,612
ELECTRIC BAKING AND BROILING OVENS Filed Oct. 29, 1953      3 Sheets-Sheet 2

INVENTOR.
Douglas W. Quirk
BY
Smith, Olsen, Baird & Galbrandsen
Attys.

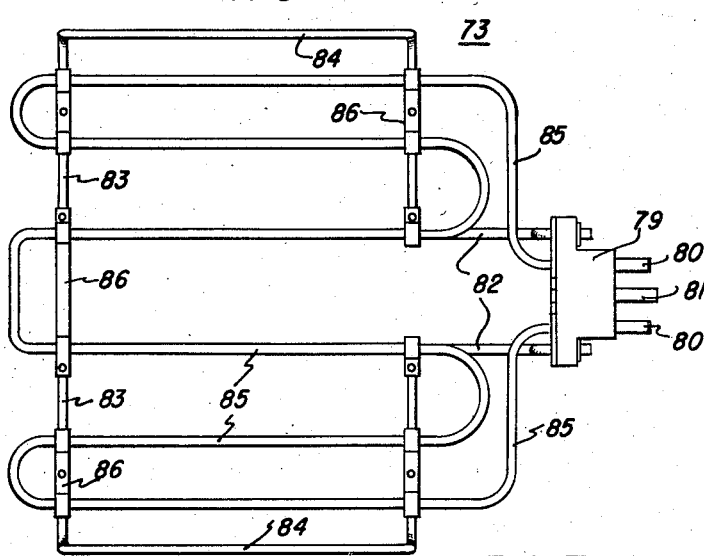
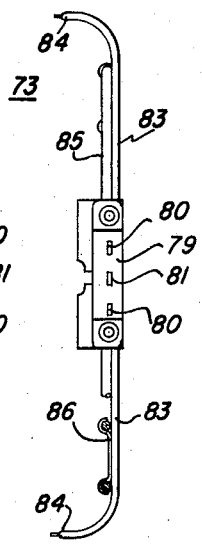
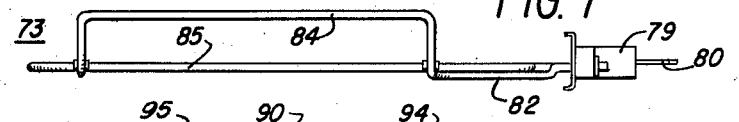
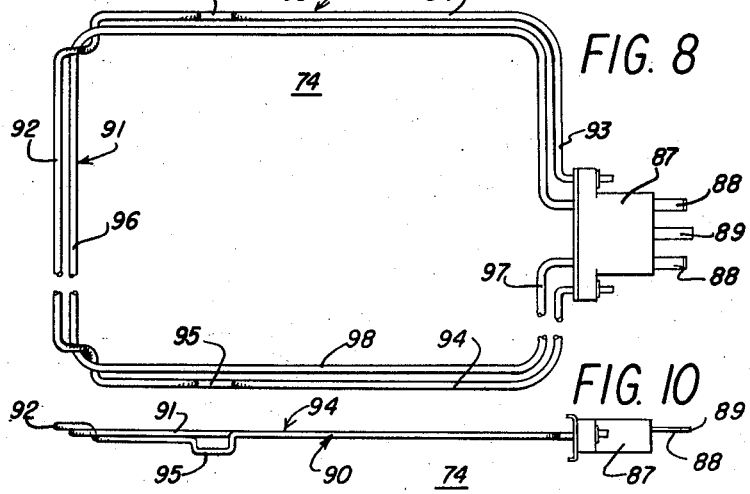

United States Patent Office 2,850,612
Patented Sept. 2, 1958

2,850,612

ELECTRIC BAKING AND BROILING OVENS

Douglas W. Quirk, Deerfield, Ill., assignor to General Electric Company, a corporation of New York Application October 29, 1953, Serial No. 388,972

5 Claims. (Cl. 219—35)

The present invention relates to electric baking and broiling ovens for ranges, or the like; and it is the general object of the present invention to provide such an oven that is efficient in operation, has a maximum usable cooking volume in the oven chamber, and is productive of a substantially uniform cooking effect throughout the usable cooking volume thereof.

In a conventional electric oven of the character noted, the lower heating unit is baffled, and frequently the upper heating unit is also baffled, for the purpose of obtaining some degree of uniformity of the cooking effect throughout the usable cooking volume thereof; which baffle not only reduces substantially the ratio between the usable cooking volume and the total actual volume of the oven chamber, but is of limited utility in accomplishing its intended function. Moreover, the baffle serves as a heat absorber with respect to the associated heating unit, tending to prolong the initial preheat period, and serves as a heat re-radiator with respect to the adjacent portion of the cooking volume, effecting an additional reduction in the usable cooking volume. Also the baffle has considerable heat mass, tending to increase the swing of the oven thermostat with respect to the desired preset cooking temperature. Further, the baffle complicates cleaning of the interior of the oven chamber, leading to extra work in maintaining the oven in proper and sanitary operating condition.

Accordingly, it is another object of the invention to provide an electric oven of the character noted, that incorporates simple unbaffled upper and lower heating units that afford a maximum ratio between the usable cooking volume and the total actual volume of the oven chamber, whereby the cooking of a maximum amount of product in an oven chamber of fixed overall dimensions may be realized, and cleaning of the oven chamber is greatly facilitated.

A further object of the invention is to provide an electric oven of the character noted, that has a high-speed of preheat from an initial ambient temperature, that requires a minimum wattage to maintain a standard cooking temperature in the oven chamber, and that is properly ventilated to maintain the desired balance between the exhaust of undesirable oven gas and cooking fumes from the oven chamber and retention of sufficient moisture in the circulated oven gas to achieve superb flavor and appearance in the cooked product.

A further object of the invention is to provide an electric oven of the character noted, that achieves both a substantially uniform cooking effect and a substantially constant browning characteristic throughout the entire usable cooking volume of the oven chamber.

A still further object of the invention is to provide in an oven of the character noted, an improved and simplified electric heating unit.

The present invention is predicated fundamentally upon the discovery that the cooking characteristics previously noted may be obtained in an oven chamber by providing relatively low heat distributed over the top wall thereof, employing an upper unbaffled heating unit, in combination with relatively high heat concentrated adjacent to the boundary of the bottom wall thereof, employing an unbaffled lower heating unit, together with proper ventilation of the oven chamber, when the dimensions of the oven chamber and the physical construction and arrangement of the heating units are properly related. In the arrangement, the heating units when energized produce circulation of the oven gas in the oven chamber in a general direction rearwardly across the bottom wall and upwardly over the rear wall and forwardly across the top wall and downwardly over the front wall, fresh air being drawn into the circulated oven gas adjacent to the lower front of the oven chamber, and some of the oven gas from the circulated oven gas being discharged adjacent to the upper rear of the oven chamber; whereby a substantially uniform cooking effect and a substantially constant browning characteristic are maintained throughout the usable cooking volume. The lower heating unit effects rather violent turbulation of the oven gas in rising curtains immediately adjacent to the boundary of the bottom wall that combine with the general circulation of the oven gas, previously noted, to effect gentle turbulation of the oven gas throughout the usable cooking volume.

It is a particular feature of the invention that the lower heating unit essentially consists of a sheathed resistance conductor of rod-like form and of open loop-like configuration including front and rear and side portions spaced inwardly of and adjacent to the respective junctions of the front and rear and side walls with the bottom wall of the oven chamber.

Another feature of the invention pertains to the simple arrangement for obtaining proper ventilation of the oven chamber that essentially consists of spacing the lower front portion of the front wall of the oven chamber, the inner wall of the front door, forwardly with respect to the cooperating lower portion of the open front of the oven liner so as to provide an elongated narrow crack-like fresh air inlet adjacent to the lower front of the oven chamber.

A further feature of the invention pertains to the arrangement of the upper and lower heating units, accommodating considerable latitude in the height of the oven chamber, whereby the same upper and lower heating units may be employed either in relatively high main oven chamber or in a relatively low companion oven chamber, while achieving the desired cooking characteristics, previously described, in both the relatively large main oven and the relatively small companion oven.

Further features of the invention pertain to the particular arrangement of the elements of the electric baking and broiling oven, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 5 is an enlarged bottom view of the upper heating unit incorporated in the main oven of the range shown in Figs. 1 and 2;

Fig. 6 is an enlarged rear view of the upper heating unit shown in Fig. 5;

Fig. 7 is an enlarged inverted side view of the upper heating unit shown in Fig. 5;

Fig. 8 is an enlarged fragmentary top view of the lower heating unit incorporated in the main oven of the range shown in Figs. 1 and 2;

Fig. 9 is an enlarged fragmentary rear view of the lower heating unit shown in Fig. 8; and Fig. 10 is an enlarged side view of the lower heating unit shown in Fig. 8.

Figure 1:
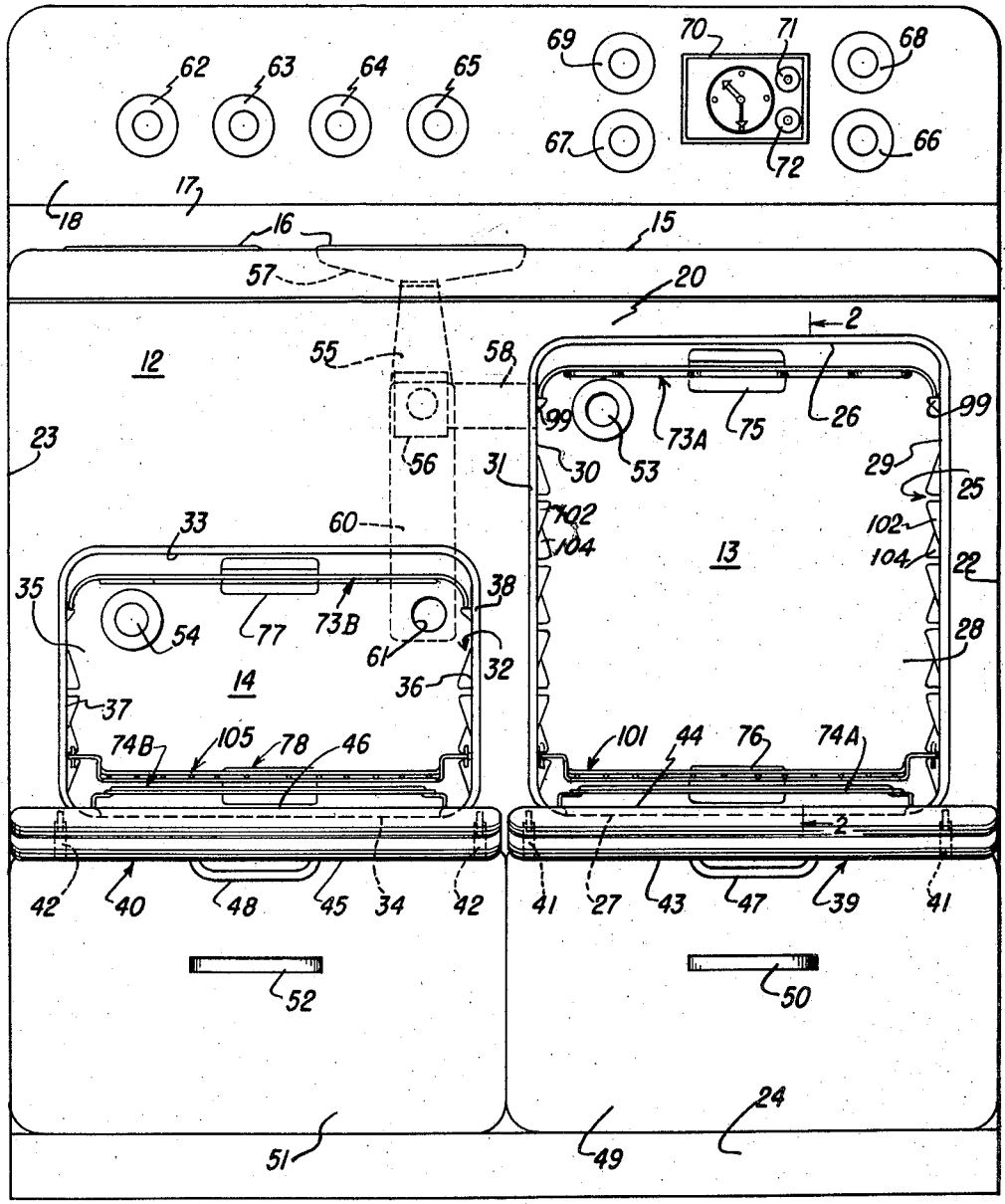
Figure 1 is a front elevational view of an electric range provided with main and companion baking and broiling ovens embodying the present invention, the two oven doors being illustrated in their open positions.
Figure 2:
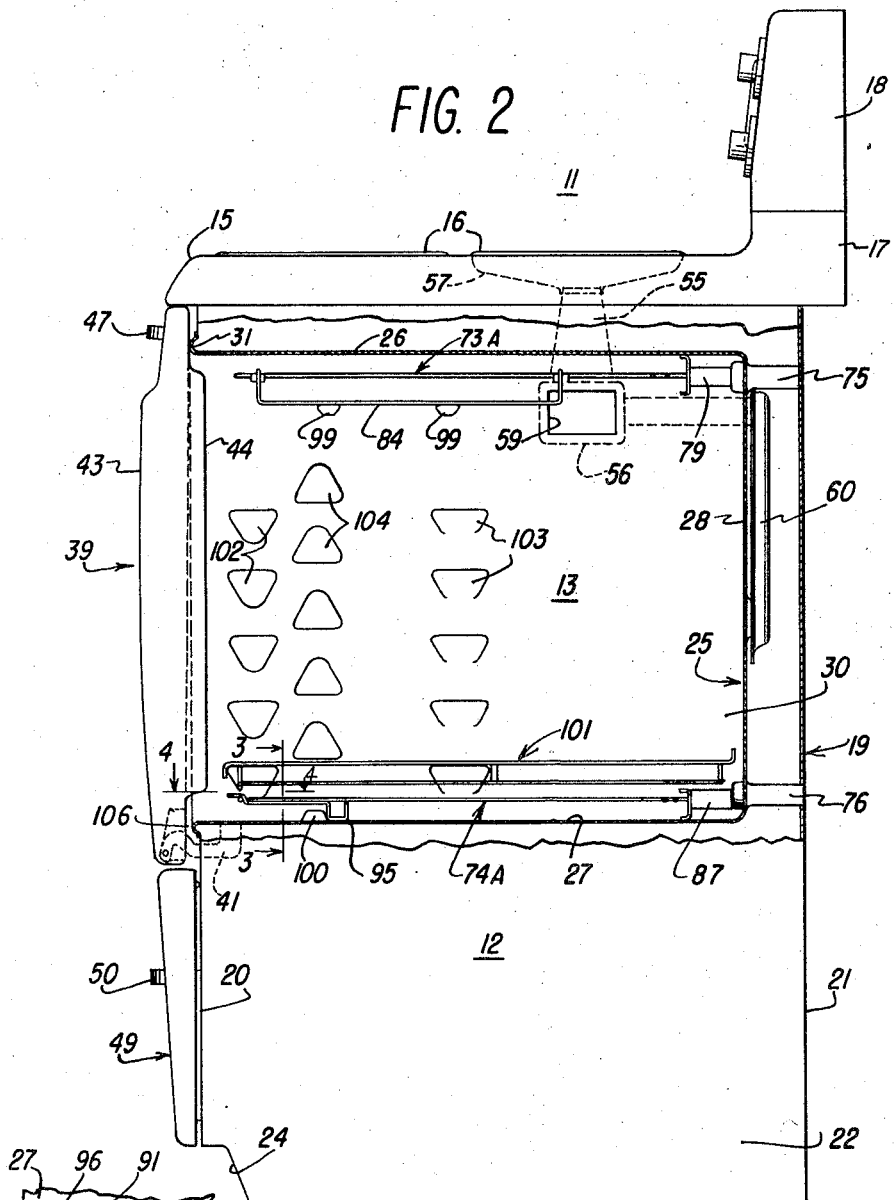
Fig. 2 is a combined side elevational view of the range, and a vertical sectional view of the main oven, taken in the direction of the arrows along the line 2—2 in Fig. 1.

Referring now to Figs. 1 and 2 of the drawings, the electric range 11 there illustrated comprises an upstanding body 12 provided with respective main and companion electric baking and broiling ovens 13 and 14, each embodying the features of the present invention. More particularly, the body 12 is provided with a substantially horizontal cooking top 15 supporting four surface heating units or hotplates 16 arranged in spaced-apart relation in a substantially rectangular pattern on the left-hand side thereof; and the rear of the cooking top 15 terminates in an upwardly directed pedestal 17 carrying an upstanding backsplash 18. Specifically, the body 12 includes an outer metal shell 19 that may be of general wrap-around construction and provided with front and rear walls 20 and 21 and connecting side walls 22 and 23, the lower front portion of the front wall 20 being rearwardly offset to provide a toe-receiving recess, as indicated at 24.

The main oven 13 is defined by a hollow metal liner 25 arranged in the upper right-hand portion of the body 12, the liner 25 including top and bottom walls 26 and 27, a rear wall 28 and opposed side walls 29 and 30, and having an open front surrounded by an outwardly directed marginal flange or rim 31 and defining the oven chamber. Similarly, the companion oven 14 is defined by a hollow metal liner 32 arranged in the upper left-hand portion of the body 12, the liner 32 including top and bottom walls 33 and 34, a rear wall 35 and opposed side walls 36 and 37, and having an open front surrounded by an outwardly directed marginal flange or rim 38 and defining the oven chamber.

The ovens 13 and 14 are respectively provided with cooperating front doors 39 and 40 respectively hinged adjacent to the lower edges thereof, as indicated by the hinge mechanisms 41 and 42, respectively. More particularly, the front door 39 includes a metal outer shell 43 and a metal inner wall 44 and is movable between open and closed positions with respect to the open front of the main oven 13; whereby the inner wall 44 constitutes a front wall for the oven chamber 13 when the door 39 occupies its closed position. Similarly, the front door 40 includes a metal outer shell 45 and a metal inner wall 46 and is movable between open and closed positions with respect to the open front of the companion oven 14; whereby the inner wall 46 constitutes a front wall for the oven chamber 14 when the door 40 occupies its closed position. Further, the doors 39 and 40 are respectively provided with operating handles 47 and 48 to facilitate the movements thereof between their open and closed positions.

Also, the lower right-hand portion of the body 12 is provided with a cavity that receives a slidable drawer, not shown, that, in turn, is provided with a front panel 49 carrying a drawer-pull 50; similarly, the lower left-hand portion of the body 12 is provided with a cavity that receives a slidable drawer, not shown, that, in turn, is provided with a front panel 51, carrying a drawer-pull 52. The areas of the front doors 39 and 40 and the front panels 49 and 51 are substantially commensurate with the area of the front wall 20 so that when these elements occupy their normal closed positions the front of the range 11 is continuous and unbroken in appearance between the front of the cooking top 15 and the toe-receiving recess 24.

A lamp-receiving cavity covered by an associated translucent lens 53 is arranged in the upper left-hand portion of the rear wall 28 for the purpose of illuminating the oven chamber 13 when the front door 39 occupies its open positions; and similarly, a lamp-receiving cavity covered by an associated translucent lens 54 is arranged in the upper left-hand portion of the rear wall 35 for the purpose of illuminating the oven chamber 14 when the front door 40 occupies its open position.

For the purpose of ventilating the ovens 13 and 14, a flue system is provided that includes an upstanding stack 55 communicating between a flue box 56 and a drip pan 57 provided below the right rear hotplate 16. In turn, the flue box 56 communicates with the upper rear portion of the oven chamber 13 via a flue 58 terminating in a substantially rectangular oven gas outlet 59 provided in the upper rear portion of the side wall 30. Also the flue box 56 communicates with the upper rear portion of the oven chamber 14 via a flue 60 arranged rearwardly of the rear wall 35 and terminating in a substantially circular oven gas outlet 61 provided in the upper right-hand portion of the rear wall 35.

Further, the range 11 comprises an electric control system including a three-wire Edison source of current supply of single-phase, 236 volts A. C., not shown, four hotplate control switches 62, 63, 64 and 65 for selectively controlling the energization of the four hotplates 16, two oven control switches 66 and 67 for selectively controlling the energization of the heating units, described more fully hereinafter, provided in the respective ovens 13 and 14, two oven thermostats 68 and 69 for selectively setting the desired cooking temperatures in the respective ovens 13 and 14, and an oven timer clock 70. The details of the electric control system that is incorporated in the range 11 form no part of the present invention, but in passing, it is noted that the system may be identical to that disclosed in the copending application of Edward L. Macoicz, Serial No. 382,693, filed September 28, 1953. Accordingly, each of the control switches 62, 63, 64 and 65 may be of the rotary type including off, high, second, third, low and warm positions; each of the control switches 66 and 67 may be of the rotary type including off, broil, regular-bake and time-bake positions; and the oven timer clock 70 includes a rotatable start-time setting knob 71 and a rotatable stop-time setting knob 72. In the arrangement, the oven timer clock 70 is operative to initiate and to arrest a cooking operation at the respectively set start clock time and stop clock time in either or both of the ovens 13 and 14.

In the main oven 13, removable upper and lower heating units 73A and 74A are provided that cooperate with respective upper and lower electrical sockets 75 and 76 carried by the rear wall 28; and similarly, in the companion oven 14, removable upper and lower heating units 73B and 74B are provided that cooperate with respective upper and lower electrical sockets 77 and 78 carried by the rear wall 35. The upper heating units 73A and 73B respectively provided in the upper portions of the ovens 13 and 14 are identical in construction and arrangement and are indicated generally by the reference numeral 73 in Figs. 5 to 7, inclusive; and similarly, the lower heating units 74A and 74B respectively provided in the lower portions of the ovens 13 and 14 are identical in construction and arrangement and are generally indicated by the reference numeral 74 in Figs. 8 to 10, inclusive.

Referring now to Figs. 5 to 7, inclusive, the upper heating unit 73 comprises an insulating plug 79 adjacent to the rear thereof that includes a pair of spaced-apart electrical terminals 80, as well as an intermediate guide prong 81, the elements 80 and 81 being receivable in the cooperating electrical socket, in the usual manner. The plug 79 carries a forwardly extending substantially U-shaped self-supporting rod 82, that, in turn, carries two laterally extending substantially U-shaped self-supporting brackets 83, the supporting brackets 83 being provided with downwardly extending supporting bars 84. A heating element 85 of the sheathed-resistance conductor type and of open substantially sinuous configuration is carried by the elements 82 and 83 and extends electrically between the terminals 80, the sheath of this rod-like heating element 85 being appropriately secured to the elements 82 and 83 by cooperating clips 86 in order to provide a unitary composite removable structure.

Referring now to Figs. 8 to 10, inclusive, the lower heating unit 74 comprises an insulating plug 87 adjacent to the rear thereof that includes a pair of spaced-apart electrical terminals 88, as well as an intermediate guide prong 89, the elements 88 and 89 being receivable in the cooperating electrical socket, in the usual manner. The plug 87 carries a forwardly extending self-supporting rod 90 of substantially rectangular loop-like configuration, that, in turn, carries a heating element 91 of the sheathed-resistance conductor type, also of substantially rectangular loop-like configuration, and extending electrically between the terminals 88. The rod 90 includes front and rear portions 92 and 93 and connecting side portions 94, the side portions 94 being provided with downwardly extending supporting feet 95 adjacent to the front portion 92. Also the front of the side portions 94 are disposed primarily below the rear thereof between the front portion 92 and the feet 95 so that they may extend upwardly adjacent to the front portion 92 in order to provide an entwining of the rod 90 and the heating element 91 for supporting purposes. Accordingly, the heating element 91 includes front, rear and side portions 96, 97 and 98 respectively arranged adjacent to the front, rear and side portions 92, 93 and 94 of the rod 90, the front portion 96 of the heating element 91 being disposed rearwardly and below the front portion 92 of the rod 90, and the rear and side portions 97 and 98 of the heating element 91 being disposed inwardly and substantially coplanar with the rear and side portions 93 and 94 of the rod 90.

Again referring to Figs. 1 and 2, the upper heating unit 73A is removably supported in place in the upper portion of the main oven chamber 13 and spaced below and adjacent to the top wall 26 by an arrangement including two pairs of longitudinally spaced-apart bosses 99 arranged in lateral alignment and respectively provided in the upper portions of the side walls 29 and 30, two of the bosses 99 respectively cooperating with each of the laterally spaced-apart bars 84 carried by the upper heating unit 73A. When the upper heating unit 73A is in its normally supported position, the electrical plug 79 is in cooperating relation with the electrical socket 75 establishing the electrical connections to the heating element 85. The lower heating unit 74A is removably supported in place in the lower portion of the main oven chamber 13 and spaced above and adjacent to the bottom wall 27 by an arrangement including the cooperation between the two laterally spaced-apart feet 95 and the bottom wall 27. Also for the purpose of positioning the lower heating unit 74A, a pair of laterally spaced-apart and aligned bosses 100 are provided in the bottom wall 27 adjacent to the side walls 29 and 30 and respectively cooperating with the feet 95. When the lower heating unit 74A is in its normally supported position, the electrical plug 87 is in cooperating relation with the electrical socket 76 establishing the electrical connections to the heating element 91.

In the companion oven chamber 14, the arrangement for removably securing the upper heating unit 73B in place adjacent to the top wall 33, and the arrangement for removably securing the lower heating unit 74B in place adjacent to the bottom wall 34, are respectively identical to the corresponding arrangements provided in the main oven 13, described above, and are not redescribed, in the interest of brevity.

The main oven 13 is normally provided with three removable shelves, only the lowermost of which is illustrated at 101, which shelves are adapted to be supported in any one of five adjustable vertical positions in the main over chamber 13 by an arrangement including five pairs of bosses 102, five pairs of bosses 103 and five pairs of bosses 104 carried by the side walls 29 and 30 of the liner 25. The bosses 102 are arranged in two vertical tiers on the respective walls 29 and 30 adjacent to the open front of the liner 25, the bosses 102 of each pair being laterally aligned with each other. The bosses 103 are arranged in two vertical tiers on the respective walls 29 and 30 adjacent to the intermediate portion of the liner 25, the bosses 103 of each pair being laterally aligned with each other. The bosses 104 are arranged in two vertical tiers on the respective walls 29 and 30 immediately behind the bosses 102, the bosses 104 of each pair being laterally aligned with each other. In the arrangement a pair of bosses 102, a pair of the bosses 103, and a pair of the bosses 104 comprise a set for locating the shelf 101 in a given vertical adjusted position; and specifically in each set the bosses 102 and 103 are arranged in longitudinal alignment on each of the walls 29 and 30, and the bosses 104 are arranged above the aligned bosses 102—103 on the respective walls 29 and 30. The arrangement accommodates longitudinal sliding movements of the shelf 101 in any one of its vertical adjusted positions. More particularly, when the shelf 101 occupies its fully retracted position within the main oven chamber 13, it is supported by the cooperation between the pairs of bosses 102 and 103; and when the shelf 101 occupies its partially withdrawn position with respect to the main oven chamber 13, it is supported by the cooperation between the pairs of bosses 102 and 104. Of course, it will be understood that the shelf 101 may be completely removed from the main oven chamber 13 by tilting the upper withdrawn edge thereof upwardly so as to bring about unhooking of the rear edge thereof from the pair of bosses 104.

The companion oven 14 is normally provided with a single removable shelf 105, that may be supported in either of two vertical adjustable positions in the oven chamber 14; and the arrangement for adjustably supporting the shelf 105 in the companion oven 14 is identical to that for adjustably supporting the shelf 101 in the main oven 13, described above, and is not redescribed in the interest of brevity. Also the shelf 101 and the shelf 105 are of identical construction and arrangement so that they are interchangeable with respect to the ovens 13 and 14.

Consider now in greater detail the structural examples of the ovens 13 and 14. In the main oven liner 25, the vertical distance between the top and bottom walls 26 and 27 is approximately 18" ±½", the horizontal distance between the side walls 29 and 30 is approximately 16" ± ¼", and the horizontal distance between the front flange 31 and the rear wall 28 is approximately 20¾" ±½". In the companion oven liner 32, the vertical distance between the top and bottom walls 33 and 34 is approximately 10½" ±½", the horizontal distance between the side walls 36 and 37 is approximately 16" ±¼", and the horizontal distance between the front flange 38 and the rear wall 35 is approximately 20¾" ±½".

Figure 3:
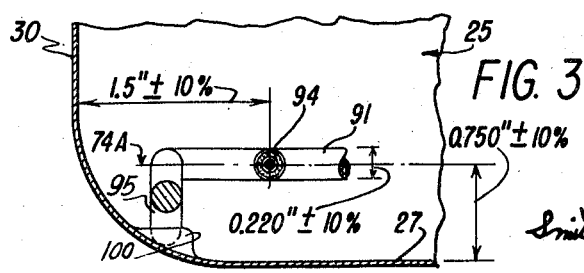
Fig. 3 is a greatly enlarged fragmentary vertical sectional view of the lower front left-hand side of the main oven, taken in the direction of the arrows along the line 3—3 in Fig. 2.
Figure 4:
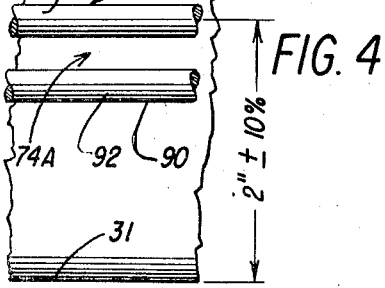
Fig. 4 is a greatly enlarged fragmentary horizontal sectional view of the lower central front of the main oven, taken in the direction of the arrows along the line 4—4 in Fig. 2.

Since the upper heating unit 73A is unbaffled, the usable cooking volume in the main oven chamber 13 extends upwardly within about 1½" thereof; and since the lower heating unit 74A is unbaffled, the usable cooking volume in the main oven chamber 13 extends downwardly within about ½" thereof. Also the usable cooking volume in the main oven 13 extends immediately adjacent to the front and rear walls 44 and 28 and to the side walls 29 and 30; whereby the ratio between the usable cooking volume and the total actual volume of the main oven chamber 13 is in excess of 75%. Moreover, when the shelf 101 is in its lowermost position, it is spaced above the lower heating unit 74A a distance not in excess of ½". Furthermore, as illustrated in Fig. 3, the center line of the side portion 94 of the heating element 91 of the lower heating unit 74A is spaced inwardly from the adjacent side wall 30 of the liner 25 by a distance of about 1.5" ±10%, and is spaced above the adjacent bottom wall 27 of the liner 25 by a distance of about 0.750" ±10%; and the diameter of the sheath of the heating element 91 is about 0.220" ±10%. Finally, as shown in Fig. 4, the center line of the front portion 96 of the heating element 91 of the lower heating unit 74A is spaced rearwardly from the adjacent marginal flange 31 of the bottom wall 27 of the liner 25 by a distance of about 2" ±10%. Accordingly, in the lower heating unit 74A the lateral distance between the side portions 94 of the heating element 91 is about 13¼"; and the longitudinal distance between the front and rear portions 96 and 93 of the heating element 91 is about 16". The dimensional details of the heating element 85 of the upper heating unit 73A are not nearly so critical as are those of the heating element 91 of the lower heating unit 74A, as described above. However, in the present example, the diameter of the sheath of the heating element 85 is about 0.220"; the lateral distance between the outside loops thereof is about 13¼"; and the longitudinal distance between the front and rear loops thereof is about 15¾". The corresponding dimensional details of the elements arranged in the companion oven 14 are substantially the same as those described in conjunction with the main oven 13, except that in the companion oven 14 the ratio between the usable cooking volume and the total actual volume is reduced by the corresponding smaller vertical distance between the top and bottom walls 33 and 34 of the liner 32. Thus it may be stated that in an oven of the present construction the vertical distance between the top and bottom walls thereof should be within the approximate range 10" to 20".

As previously noted, the front door 39 of the main oven 13 is pivotally mounted adjacent to the lower edge thereof upon laterally spaced-apart pairs of hinge mechanisms 41; and in the arrangement, the door 39 is slightly inclined upwardly and rearwardly, when it is in its closed position, so that the upper portion of the inner wall 44 thereof, the front wall of the oven chamber 13, engages the corresponding upper portion of the marginal flange 31 of the liner 25, but the lower portion of the front wall 44 is spaced forwardly of the corresponding lower portion of the marginal flange 31 of the liner 25 by a distance within the approximate range 0.010" to 0.050", as indicated at 106 in Fig. 2, for the purpose of providing a fresh air inlet into the main oven chamber 13. The arrangement of the front door 40 of the companion oven 14 is the same as that described above in conjunction with the front door 39 of the main oven chamber 13, and is not redescribed in the interest of brevity.

Considering now the operation of the main oven 13 in conjunction with a regular baking operation, the cook sets the main oven control switch 66 into its regular bake position and sets the main oven thermostat 68 into the desired baking temperature; whereby the upper heating unit 73A is energized with about 925 watts ±10% across one of the outside line conductors and the neutral line conductor of the source of current supply, while the lower heating unit 74A is energized with about 2000 watts ±10% across the two outside line conductors of the source of current supply (these wattages being appropriate when the walls 26, 27, 28, 29, 30 and 44 facing the main oven chamber 13 are provided with vitreous enamel ground coatings). In this connection, it is noted that the two wattages mentioned may be reduced about 30% and respectively to about 650 watts ±10% and about 1400 watts ±10%, when the walls mentioned facing the main oven chamber 13 are provided with metal-bright surfaces. However, it is normally preferable to provide the walls mentioned with the vitreous enamel ground coatings, as a matter of simplicity of construction; whereby it will be assumed that the higher first-mentioned wattages are employed. When the upper heating unit 73A is thus energized, it is at black heat having a normal operating temperature of about 800° F. ±10%; and when the lower heating unit 74A is thus energized, it is at cherry heat having a normal operating temperature of about 1600° F. ±10%. When the upper and lower heating units 73A and 74A are thus energized, the oven gas is circulated in the main oven chamber 13 by the convection currents bringing about the drawing of fresh air through the fresh air inlet 106 into the circulated oven gas and the discharge of some of the oven gas through the oven gas outlet 59 from the circulated oven gas. In the arrangement, the rate of drawing of fresh air into the main oven 13 should be within the approximate range 1 to 5 cubic feet per minute, so as to effect the removal of excess moisture and undesirable oven fumes therefrom, while retaining proper moisture content in the circulated oven gas to obtain superb baking of the product.

More particularly, the general direction of circulation of the oven gas in the main oven chamber 13 is rearwardly across the bottom wall 27 and upwardly over the rear wall 28 and forwardly across the top wall 26 and downwardly over the front wall 44, the door 39 occupying its closed position; whereby gentle turbulation of the oven gas throughout the usable cooking volume is obtained. Moreover, rising currents of oven gas proceed upwardly along the walls 28, 29, 30 and 44 by virtue of the concentration of the heat of the lower heating unit 74A adjacent to the boundary of the bottom wall 27; which rising currents of oven gas commingle with the general circulation of the oven gas to produce the gentle turbulation of the oven gas throughout the usable volume in the main oven chamber 13. Of course, the lower heating unit 74A effects the projection of radiant heat into the main oven chamber 13; which radiant heat is most intense adjacent to the junctions of the walls 28, 29, 30 and 44 with the bottom wall 27 by virtue of the loop-like configuration of the heating element 91 of the lower heating unit 74A. Also, the upper heating unit 73A assists in the production of circulation of the oven gases in the main oven chamber 13 and is also productive of radiant heat that is projected into the main oven chamber 13; which radiant heat is rather uniformly distributed over the top wall 26, since the heating element 85 of the upper heating unit 73A has the sinuous-distributed configuration. The combination of the radiant heat projected from the heating units 73A and 74A into the main oven chamber 13 and the circulation and turbulation of the oven gas therethrough is productive of a substantially uniform cooking effect, as well as a substantially uniform browning characteristic, throughout the usable cooking volume of the main oven chamber 13.

The substantially uniform cooking effect and the substantially uniform browning characteristic of the main oven 13, employing the construction and arrangement of the elements of the main oven 13, described above, may be dramatically demonstrated by placing the three shelves 101 in the respective lowermost, uppermost and intermediate positions in the main oven chamber 13, by placing three standard layer cakes upon each of the three shelves 101, and then by carrying out a cooking operation in the main oven chamber 13 for twenty-four minutes at an oven temperature setting of 375° F. (the layer cakes being prepared of standard ingredients and by standard manipulations as prescribed by NEMA). In the test, the nine layer cakes are distributed substantially uniformly throughout the usable cooking volume of the main oven chamber 13 so that the cooking thereof presents a fair and reasonable test of the uniformity of the cooking effect and the uniformity of the browning characteristic throughout the usable cooking volume in the main oven chamber 13. At the conclusion of the cooking test, it will be discovered invariably that each of the nine cakes is cooked thoroughly and uniformly, without boiling of the mixed ingredients; and the browning is also thorough and uniform; whereby it is impossible from examination to determine in which of the nine variable positions described any one of the layer cakes was cooked; and each of the layer cakes is not only of fine appearance but is most palatable.

Furthermore, the main oven 13 has a high efficiency, and an entirely satisfactory and fast preheat characteristic, requires modest power to maintain a standard temperature oven setting of 400° F., and causes a minimum swing of the temperature of the main oven control thermostat 68 in maintaining the previously set cooking temperature.

Considering now the operation of the main oven 13 in conjunction with a broiling operation, the cook sets the main control switch 66 into its broil position, sets the main oven thermostat 68 into its highest temperature setting, and cracks the front door 39 to obtain broiling ventilation; whereby the upper heating unit 73A is energized with about 3700 watts ±10% across the outside line conductors of the source of current supply; and the lower heating unit 74A is deenergized. Accordingly, the upper heating unit 73A produces substantially uniformly distributed heat with respect to the top wall 26, the upper heating unit 73A being at bright-red heat having a normal operating temperature of about 1450° F. ±10%; whereby the heat concentrated in the upper portion of the main oven chamber 13 is productive of an entirely satisfactory broiling operation.

In order to carry out a time baking operation in the main oven 13, the cook sets the main oven control switch 66 into its time-bake position, sets the main oven thermostat 68 into the desired baking temperature, and appropriately sets the oven timer clock 70 in accordance with the desired stop-time and start-time, employing the corresponding control knobs 72 and 71. The operation of the main oven 13 in carrying out a timed baking operation is essentially the same as the operation thereof in carrying out a regular baking operation, as previously described, except that the operative time interval is controlled by the oven timer clock 70.

The operations of the companion oven 14 in carrying out regular baking, broiling and time baking operations are essentially the same as those of the main oven 13, described above, and are not redescribed in the interest of brevity. Of course, the operation of the companion oven 14 is controlled by the companion oven control switch 67, and the cooking temperature therein is selectively established by the companion oven thermostat 69. Also a time baking operation in the companion oven 14 is selectively controlled by the oven timer clock 70.

In connection with the oven timer clock 70, it is pointed out that either one, or both, of the ovens 13 and 14 may be selectively controlled by the oven timer clock 70 when the corresponding oven control switch 66 or 67 occupies its corresponding time-bake position; whereby both of the ovens 13 and 14 will be controlled by the oven timer clock 70 when both of the oven control switches 66 and 67 occupy their time-bake positions.

As previously explained, the ventilating system for the main oven 13 includes the oven gas outlet 59 and the ventilating system for the companion oven 14 includes the oven gas outlet 61; whereby the oven gases are combined in the flue box 56, when both of the ovens 13 and 14 are operating, and discharged through the stack 55 into the space defined above the drip pan 57 associated with the right rear hotplate 16.

Reconsidering the construction and arrangement of the oven, with regard to the dimensional characteristic thereof, it is reiterated that considerable latitude is permissible in the height thereof, while preserving the special characteristics previously described; whereby the main oven 13 is about 18" high and the companion oven 14 is about 10½" high; however the width of the oven (about 16") is rather critical and should be maintained within ±¼"; likewise, the depth of the oven (about 20¾") is rather critical and should be maintained within ±½"; also, the front and side portions 92 and 94 of the heating element 91 of the lower heating unit 73A should be maintained within ±10% of the distances specified; and the wattage rates of the upper and lower heating units should be maintained within ±10% of the values specified. Moreover, these dimensions and wattage ratings, as specified, are related and must be maintained in order to obtain the desired cooking characteristics previously described, with particular reference to the uniformity of the distribution of the cooking effect in the oven. By way of illustration, it is noted that even in the apparently minor matter of the spacing of the side portions 94 of the heating element 91 of the lower heating unit 74A from the respective side and bottom walls of the associated oven liner, beyond the ±10% of the distances specified lack of uniformity of the heating effect in the oven chamber is distinctly measurable in the lack of uniformity of the cooking and browning of the nine distributed layer cakes, utilizing the test previously explained. This criticality and relationship of the wattage ratings and constructional details are not altogether understood, but it may be generally explained that only when they are preserved are the uniform cooking characteristics previously noted achieved to the present extremities.

In passing, it is pointed out that the general principles of the law of similitude are applicable in the design of other ovens of different sizes; whereby, for example, all of the related dimensions specified may be proportionately increased by a fixed percentage while preserving the cooking characteristics previously set forth.

In view of the foregoing, it is apparent that there has been provided in an electric range, an electric baking and broiling oven of improved and simplified construction and arrangement, that is economical to manufacture, and that possesses substantially ideal baking and browning characteristics, while obtaining nearly a maximum ratio between the usable cooking volume and the total actual volume thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric oven comprising a hollow liner of substantially box-like configuration including substantially rectangular top and bottom and rear and side walls and having a substantially rectangular open front and defining an oven chamber, a door including an inner wall cooperating with the open front of said liner and mounted for movements between open and closed positions with respect thereto so that said inner wall constitutes a front wall for said oven chamber when said door occupies its closed position, an upper unbaffled heating unit arranged in said oven chamber and spaced below and closely adjacent to said rectangular top wall, whereby the usable cooking volume of said oven chamber extends upwardly closely adjacent to said upper heating unit, said upper heating unit being of substantially rectangular form and of open structure and distributed within its boundary and substantially entirely over said rectangular top wall, a lower unbaffled heating unit arranged in said oven chamber and spaced above and closely adjacent to said rectangular bottom wall, whereby the usable cooking volume of said oven chamber extends downwardly closely adjacent to said lower heating unit, said lower heating unit being of substantially rectangular form and of open structure and concentrated at its boundary and adjacent to the boundary of said rectangular bottom wall, the usable cooking volume of said oven chamber also extending outwardly closely adjacent to said front and rear and side walls, means for energizing said upper heating unit with relatively low electric power so that it produces heat at a relatively low rate distributed substantially entirely over said rectangular top wall, means for energizing said lower heating unit with relatively high electric power so that it produces heat at a relatively high rate concentrated substantially entirely adjacent to the boundary of said rectangular bottom wall, means providing an air inlet adjacent to the lower front of said oven chamber, means providing an oven gas outlet adjacent to the upper rear of said oven chamber, and means including said energized upper and lower heating units for producing circulation of the oven gas in said oven chamber and gentle turbulation of the oven gas throughout the usable cooking volume of said oven chamber and for drawing fresh air through said air inlet into the circulated oven gas and for discharging some of the oven gas through said oven gas outlet from the circulated oven gas and for maintaining a substantially uniform cooking effect throughout the usable cooking volume of said oven chamber.

2. An electric oven comprising a hollow liner of substantially box-like configuration including substantially rectangular top and bottom and rear and side walls and having a substantially rectangular open front and defining an oven chamber, a door including an inner wall cooperating with the open front of said liner and mounted for movements between open and closed positions with respect thereto so that said inner wall constitutes a front wall for said oven chamber when said door occupies its closed position, an upper unbaffled heating unit arranged in said oven chamber and spaced below and closely adjacent to said rectangular top wall, whereby the usable cooking volume of said oven chamber extends upwardly closely adjacent to said upper heating unit, said upper heating unit being of substantially rectangular form and of open structure and distributed with respect to the boundary thereof and spaced inwardly of and closely adjacent to the respective junctions of said front and rear and side walls with said rectangular top wall, a lower unbaffled heating unit arranged in said oven chamber and spaced above and closely adjacent to said rectangular bottom wall, whereby the usable cooking volume of said oven chamber extends downwardly closely adjacent to said lower heating unit, said lower heating unit essentially consisting of a sheathed resistance conductor of rod-like form and of open loop-like configuration including front and side portions spaced inwardly of and adjacent to the respective junctions of said front and side walls with said rectangular bottom wall, the usable cooking volume of said oven chamber also extending outwardly closely adjacent to said front and rear and side walls, means for energizing said upper heating unit with relatively low electric power and for energizing said lower heating unit with relatively high electric power, whereby said upper heating unit produces heat at a relatively low rate distributed over said rectangular top wall and said lower heating unit produces heat at a relatively high rate concentrated adjacent to the boundary of said rectangular bottom wall, means providing an air inlet adjacent to the lower front of said oven chamber, means providing an oven gas outlet adjacent to the upper rear of said oven chamber, and means including said energized upper and lower heating units for producing circulation of the oven gas in said oven chamber and gentle turbulation of the oven gas throughout the usable cooking volume of said oven chamber and for drawing fresh air through said air inlet into the circulated oven gas and for discharging some of the oven gas through said oven gas outlet from the circulated oven gas and for maintaining a substantially uniform cooking effect throughout the usable cooking volume of said oven chamber.

3. An electric oven comprising a hollow liner of substantially box-like configuration including substantially rectangular top and bottom and rear and side walls and having a substantially rectangular open front and defining an oven chamber, a door including an inner wall cooperating with the open front of said liner, hinge mechanism mounting said door for pivotal movements about the lower edge thereof between open and closed positions with respect to the open front of said liner so that said inner wall constitutes a front wall for said over chamber when said door occupies its closed position, an upper unbaffled heating unit arranged in said oven chamber and spaced below and closely adjacent to said rectangular top wall, whereby the usable cooking volume of said oven chamber extends upwardly closely adjacent to said upper heating unit, said upper heating unit being of substantially rectangular form and of open structure and distributed with respect to the boundary thereof and spaced inwardly of and closely adjacent to the respective junctions of said front and rear and side walls with said rectangular top wall, a lower unbaffled heating unit arranged in said oven chamber and spaced above and closely adjacent to said rectangular bottom wall, whereby the usable cooking volume of said oven chamber extends downwardly closely adjacent to said lower heating unit, said lower heating unit essentially consisting of a sheathed resistance conductor of rod-like form and of open loop-like configuration including rear and side portions spaced inwardly of and adjacent to the respective junctions of said rear and side walls with said rectangular bottom wall, the usable cooking volume of said oven chamber also extending outwardly closely adjacent to said front and rear and side walls, means for energizing said upper heating unit with relatively low electric power and for energizing said lower heating unit with relatively high electric power, whereby said upper heating unit produces heat at a relatively low rate distributed over said rectangular top wall and said lower heating unit produces heat at a relatively high rate concentrated adjacent to the boundary of said rectangular bottom wall, the upper portion of said front wall engaging the upper front of said liner and the lower portion of said front wall being spaced forwardly of the lower front of said liner so as to provide an elongated crack-like air inlet adjacent to the lower front of said oven chamber, means providing an oven gas outlet adjacent to the upper rear of said oven chamber, and means including said energized upper and lower heating units for producing circulation of the oven gas in said oven chamber and gentle turbulation of the oven gas throughout the usable cooking volume of said oven chamber and for drawing fresh air through said air inlet into the circulated oven gas and for discharging some of the oven gas through said oven gas outlet from the circulated oven gas and for maintaining a substantially uniform cooking effect throughout the usable cooking volume of said oven chamber.

4. An electric oven comprising a hollow liner of substantially box-like configuration including substantially rectangular top and bottom and rear and side walls and having a substantially rectangular open front and defining an oven chamber, a door including an inner wall cooperating with the open front of said liner and mounted for movements between open and closed positions with respect thereto so that said inner wall constitutes a front wall for said oven chamber when said door occupies its closed position, an open rod-like self-supporting substantially rectangular upper frame removably supported in the upper portion of said oven chamber and spaced below and closely adjacent to said rectangular top wall, an upper unbaffled heating unit carried by said upper frame, said upper heating unit being of substantially rectangular form and of open structure and distributed with respect to the boundary thereof and spaced inwardly of and closely adjacent to the respective junctions of said front and rear and side walls with said rectangular top wall, whereby the usable cooking volume of said oven chamber extends upwardly closely adjacent to said upper heating unit, an open rod-like self-supporting substantially rectangular lower frame removably supported in the lower portion of said oven chamber and spaced above and closely adjacent to said rectangular bottom wall, a lower unbaffled heating unit carried by said lower frame and essentially consisting of a sheathed resistance conductor of rod-like form and of open loop-like substantially rectangular configuration including front and rear and side portions spaced inwardly of and closely adjacent to the respective junctions of said front and rear and side walls with said rectangular bottom wall, whereby the usable cooking volume of said oven chamber extends downwardly closely adjacent to said lower heating unit, the usable cooking volume of said oven chamber also extending outwardly closely adjacent to said front and rear and side walls, means for energizing said upper heating unit with relatively low electric power and for energizing said lower heating unit with relatively high electric power, whereby said upper heating unit produces heat at a relatively low rate distributed over said rectangular top wall and said lower heating unit produces heat at a relatively high rate concentrated adjacent to the boundary of said rectangular bottom wall, and means including said energized upper and lower heating units for producing circulation of the oven gas in said oven chamber and gentle turbulence of the oven gas throughout the usable cooking volume of said oven chamber and for maintaining a substantially uniform cooking effect throughout the usable cooking volume of said oven chamber.

5. An electric range comprising a hollow liner of substantially box-like configuration including substantially rectangular top and bottom and rear and side walls and having a substantially rectangular open front and defining an oven chamber, a door including an inner wall cooperating with the open front of said liner and mounted for movements between open and closed positions with respect thereto so that said inner wall constitutes a front wall for said oven chamber when said door occupies its closed position, an upper unbaffled heating unit arranged in said oven chamber and spaced below and closely adjacent to said rectangular top wall, whereby the usable cooking volume of said oven chamber extends upwardly closely adjacent to said upper heating unit, said upper heating unit being of substantially rectangular form and of open structure and distributed within its boundary and substantially entirely over said rectangular top wall, a lower unbaffled heating unit arranged in said oven chamber and spaced above and closely adjacent to said rectangular bottom wall, whereby the usable cooking volume of said oven chamber extends downwardly closely adjacent to said lower heating unit, said lower heating unit being of substantially rectangular form and of open structure and concentrated at its boundary and substantially entirely adjacent to the boundary of said rectangular bottom wall, the usable cooking volume of said oven chamber also extending outwardly closely adjacent to said front and rear and side walls, and an electric supply system having a bake setting and a broil setting, said supply system in its bake setting energizing said upper heating unit with relatively low electric power so that it produces bake heat at a relatively low rate distributed substantially entirely over said rectangular top wall and energizing said lower heating unit with relatively high electric power so that it produces bake heat at a relatively high rate concentrated substantially entirely adjacent to the boundary of said rectangular bottom wall, whereby a substantially uniform baking effect is maintained throughout the usable cooking volume of said oven chamber, said supply system in its broil setting energizing said upper heating unit with relatively high electric power so that it produces broil heat at a relatively high rate distributed substantially entirely over said rectangular top wall and deenergizing said lower heating unit, whereby a preferential broiling effect is maintained in the upper portion of the usable cooking volume of said oven chamber.

References Cited in the file of this patent

UNITED STATES PATENTS

| 2,408,295 | Cossin | Sept. 24, 1946 |
| 2,556,597 | Pierson | June 12, 1951 |

FOREIGN PATENTS

| 373,831 | Great Britain | June 2, 1932 |
| 533,223 | Great Britain | Feb. 10, 1941 |
| 619,743 | Great Britain | Mar. 14, 1949 |